United States Patent [19]
Koda et al.

[11] Patent Number: 5,707,292
[45] Date of Patent: Jan. 13, 1998

[54] VIBRATION DAMPING EQUIPMENT FOR TORSIONAL DAMPER, INCLUDING A LOW RIGIDITY MEMBER

[75] Inventors: Masanori Koda, Sagamihara; Shouichi Tsuchiya, Atsugi; Atsuhiro Mori, Tsuchiura; Takashi Murasugi, Ebina, all of Japan

[73] Assignees: Nissan Motor Co., Ltd.; Unisia Jecs Corporation, both of Kanagawa, Japan

[21] Appl. No.: 589,359

[22] Filed: Jan. 22, 1996

[30] Foreign Application Priority Data

Jan. 25, 1995 [JP] Japan .................. 7-009735

[51] Int. Cl.⁶ .................................................. F16D 3/14
[52] U.S. Cl. .................... 464/68; 464/85; 192/214.1
[58] Field of Search ........................ 464/64, 66, 68, 464/85; 192/205, 209, 214, 214.1

[56] References Cited
U.S. PATENT DOCUMENTS

| | | | |
|---|---|---|---|
| 4,537,580 | 8/1985 | Loizeau et al. | 464/64 X |
| 5,269,725 | 12/1993 | Maucher et al. | 464/68 |
| 5,370,581 | 12/1994 | Rohrle et al. | 464/68 |

FOREIGN PATENT DOCUMENTS 0 641 956  3/1995  European Pat. Off. .

*Primary Examiner*—Daniel P. Stodola
*Assistant Examiner*—Emmanuel M. Marcelo
*Attorney, Agent, or Firm*—Low, Price, LeBlanc & Becker

[57] ABSTRACT

A vibration damping equipment for a torsional damper comprises a hub plate, side plates, a torsion spring, a friction block, and low rigidity members. Each low rigidity member is interposed between the hub plate and each friction block to be adjacent to each other through a partition of the hub plate. The low rigidity members are connected to each other on at least one axial side of the partition.

3 Claims, 6 Drawing Sheets

VIBRATION DAMPING EQUIPMENT FOR TORSIONAL DAMPER, INCLUDING A LOW RIGIDITY MEMBER

BACKGROUND OF THE INVENTION

The present invention relates to a vibration damping equipment for a torsional damper which is arranged, for purposes of cushioning, in a power train of a prime mover with torque variation such as an engine.

A conventionally proposed vibration damping equipment for a torsional damper is disclosed, for example, in JP-A 7-98041. Referring to FIGS. 4 and 5, the torsional damper comprises a hub plate 2 connected through a bolt 1 to one of two bodies of rotation to be drivingly coupled with each other, e.g. an engine output shaft and a torque converter, side plates 4, 5 arranged coaxial with and adjacent to the hub plate 2 and connected to the other of the two bodies of rotation through a bolt 3, and a torsion spring 6 arranged circumferentially to ensure power transmission between the hub plate 2 and the side plates 4, 5. Here, the one of the two bodies of rotation corresponds to a torque converter, and the other thereof corresponds to an engine output shaft.

The torsion spring 6 is accommodated in a rectangular window 2a formed axially through the hub plate 2 in the way to extend circumferentially. A coil portion of the torsion spring 6 protruding from the rectangular window 2a is received in rectangular windows 4a, 5a of the side plates 4, 5. Thus, both ends of the torsion spring 6 are seated on both circumferential ends of each rectangular window 2a, 4a, 5a to resiliently support the hub plate 2 and the side plates 4, 5 in the neutral position of relative rotation thereof, and ensure power transmission between the hub plate 2 and the side plates 4, 5.

Rotation of the engine output shaft is transmitted to the torque converter through the bolt 3, the side plates 4, 5, the torsion spring 6, the hub plate 2, and the bolt 1 in order. During this power transmission, the torsion spring 6 is resiliently deformed to absorb torque variation, achieving a predetermined function of cushioning.

If rotational vibration of the torsional damper occurs due to resonance upon engine start, etc., it can produce great relative rotation between the hub plate 2 and the side plates 4, 5. Such rotational vibration is attenuated by the following mechanism.

Specifically, the known vibration damping equipment for a torsional damper comprises retaining plates 7, 8 rotatably engaged with inner surfaces of the side plates 4, 5 and facing each other, and a friction block 9 interposed between the retaining plates 7, 8. A disc spring 10 is arranged between the side plate 5 and the retaining plate 8 to bias the retaining plate 8 toward the retaining plate 7, obtaining a frictional contact of the friction block 9 with the retaining plate 7, and therefore, with the side plates 4, 5.

The friction block 9 is arranged through a window or circumferential long hole 2b of the hub plate formed axially therethrough. The hub plate window 2b is shaped to enable restriction of the friction block 9 in the radial direction, but allow relative movement thereof with respect to the hub plate 2 by a clearance α in both circumferential directions. Moreover, low rigidity members 11 are arranged at both ends of the hub plate window 2b for the friction block 9, which is formed through the hub plate 2 connected to the torque converter by the bolt 1.

Such vibration damping equipment operates as follows. When an angle of torsion of the torsional damper is smaller than that corresponding to the clearance α, the friction block 9 is held by the retaining plates 7, 8, and moved with respect to the hub plate 2 together with the retaining plates 7, 8, i.e. the side plates 4, 5, without coming into collision with both ends of the hub plate window 2b. Therefore, the friction block 9 has no influence on the function of cushioning of the torsional damper, enabling sure absorption of torque variation.

If rotational vibration of the torsional damper occurs due to resonance upon engine start, etc., it can produce great relative rotation over the clearance or circumferential limiting range α between the hub plate 2 and the side plates 4, 5, i.e. great torsional displacement of the torsional damper. As a result, the friction block 9 comes into contact with the low rigidity member 11 arranged at the end of the hub plate window 2b so as to engage with the hub plate 2. Due to engagement with the hub plate 2, the friction block 9 fails to be displaced together with the side plates 4, 5, providing a frictional resistance to the side plates 4, 5. Referring to FIG. 6, this produces a great hysteresis torque within torsional displacement of the torsional damper over the circumferential limiting range α. This hysteresis torque serves to attenuate the above rotational vibration, resulting in restrained vibration.

When having, together with the side plate 4, relative displacement of the circumferential limiting range α with respect to the hub plate 2, the friction block 9 comes into collision with the hub plate 2 through the low rigidity member 11, and not directly, resulting in a solution of problems such as occurrence of loud metallic noise due to collision and vibration due to reaction.

As for the known vibration damping equipment for a torsional damper, however, in view of the structure that noise and vibration due to collision are restrained by the low rigidity members arranged in collided portions of both ends of the hub plate window, the low rigidity member should be arranged in all collided portions of the hub plate, and therefore, the low rigidity members twice as many as the friction blocks are necessary to be disposed as a whole, increasing the number of parts, resulting in a lowering of the assembling efficiency and an increase in manufacturing cost.

It is, therefore, an object of the present invention to provide a vibration damping equipment for a torsional damper which enables an effective restraint of noise and vibration due to collision with a reduced number of the low rigidity members.

SUMMARY OF THE INVENTION

There is provided, according to the present invention, a torsional damper for ensuring cushioning of torque variation between bodies of rotation to be drivingly coupled with each other, comprising:

a hub plate connected to one of the bodies of rotation, said hub plate having windows and a partition between said windows;

side plates arranged coaxial with and adjacent to said hub plate, said side plates being connected to the other of the bodies of rotation;

a torsion spring arranged circumferentially with respect to said hub plate and said side plates, said torsion spring ensuring power transmission between said hub plate and said side plates;

a friction block arranged to be in frictional contact with said side plates, said friction block being engaged with said hub plate after movement relative to said hub plate in a corresponding one of said windows of said hub plate;

low rigidity members, each being interposed between said hub plate and each friction block, said low rigidity members being adjacent to each other through said partition of said hub plate; and means for connecting said low rigidity members, said connecting means including said low rigidity members, said connecting means being disposed on one axial side of said partition with respect to the bodies of rotation, said one axial side of said partition having a greater heat capacity than another axial side of said partition.

DETAILED DESCRIPTION OF THE INVENTION

Figure 1A:
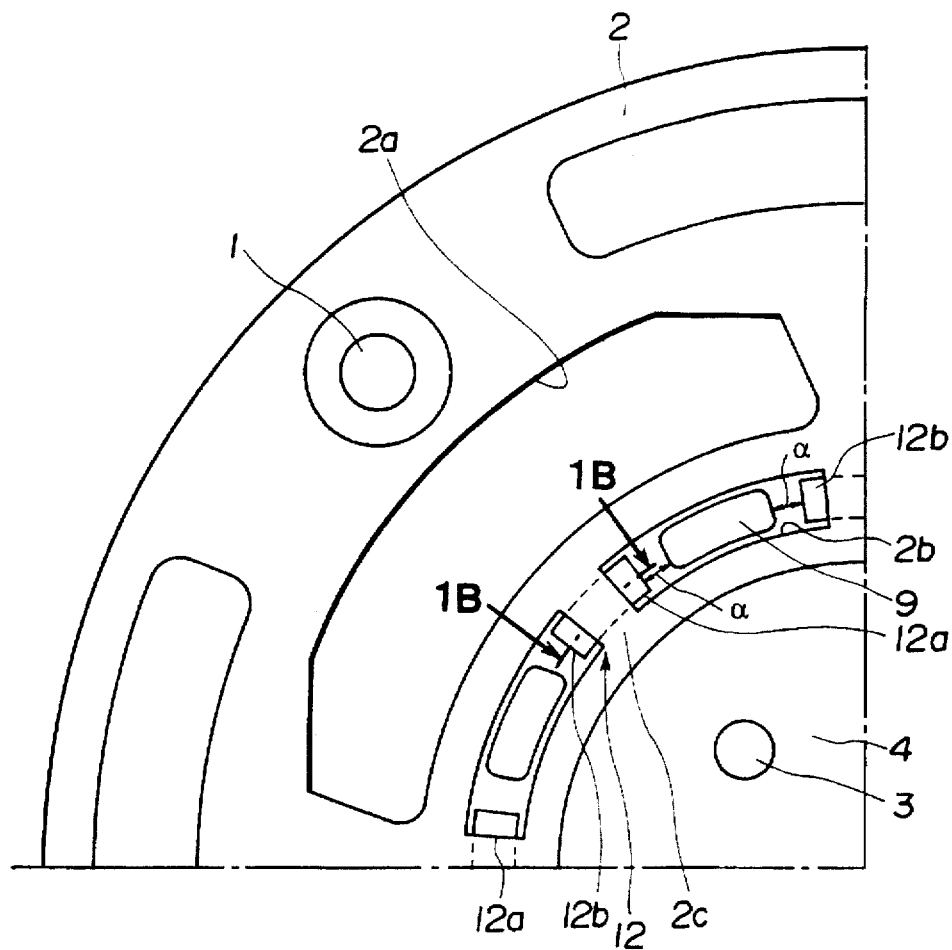
FIG. 1A is a schematic fragmentary view showing a first preferred embodiment of a vibration damping equipment for a torsional damper.

Referring to the drawings wherein like reference numerals designate like parts throughout the views, preferred embodiments of a vibration damping equipment for a torsional damper will be described in detail.

Figure 1B:
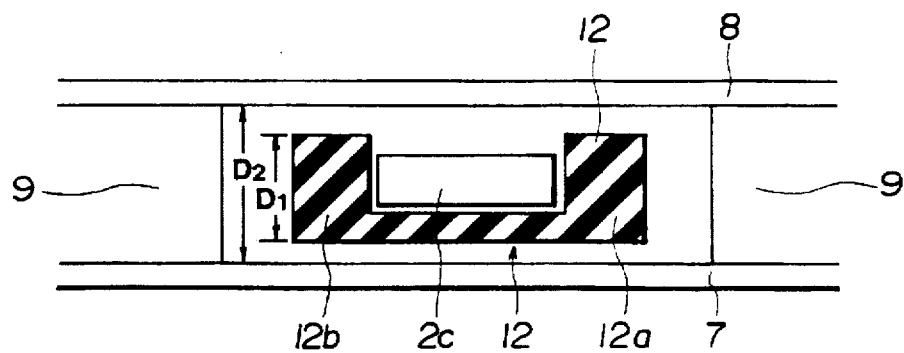
FIG. 1B is a sectional view taken along the line 1B—1B of FIG. 1A.
Figure 2:
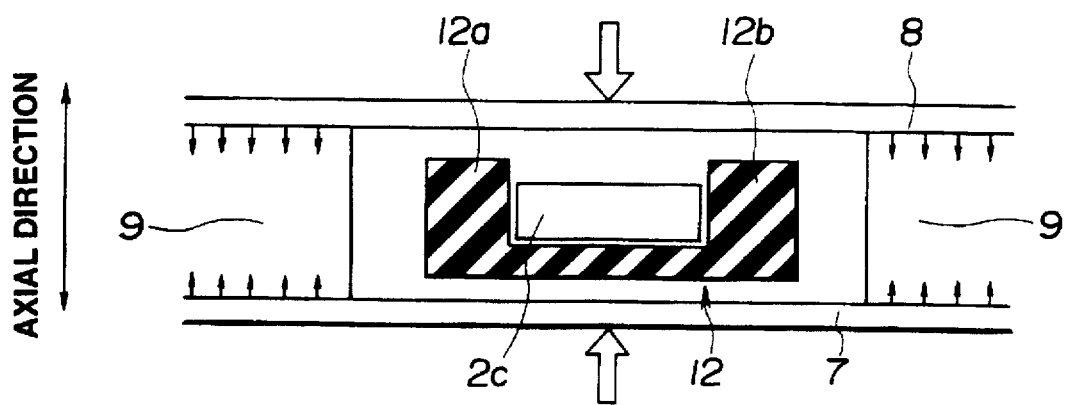
FIG. 2 is a view similar to FIG. 1B, explaining an operation of the first preferred embodiment.
Figure 4:
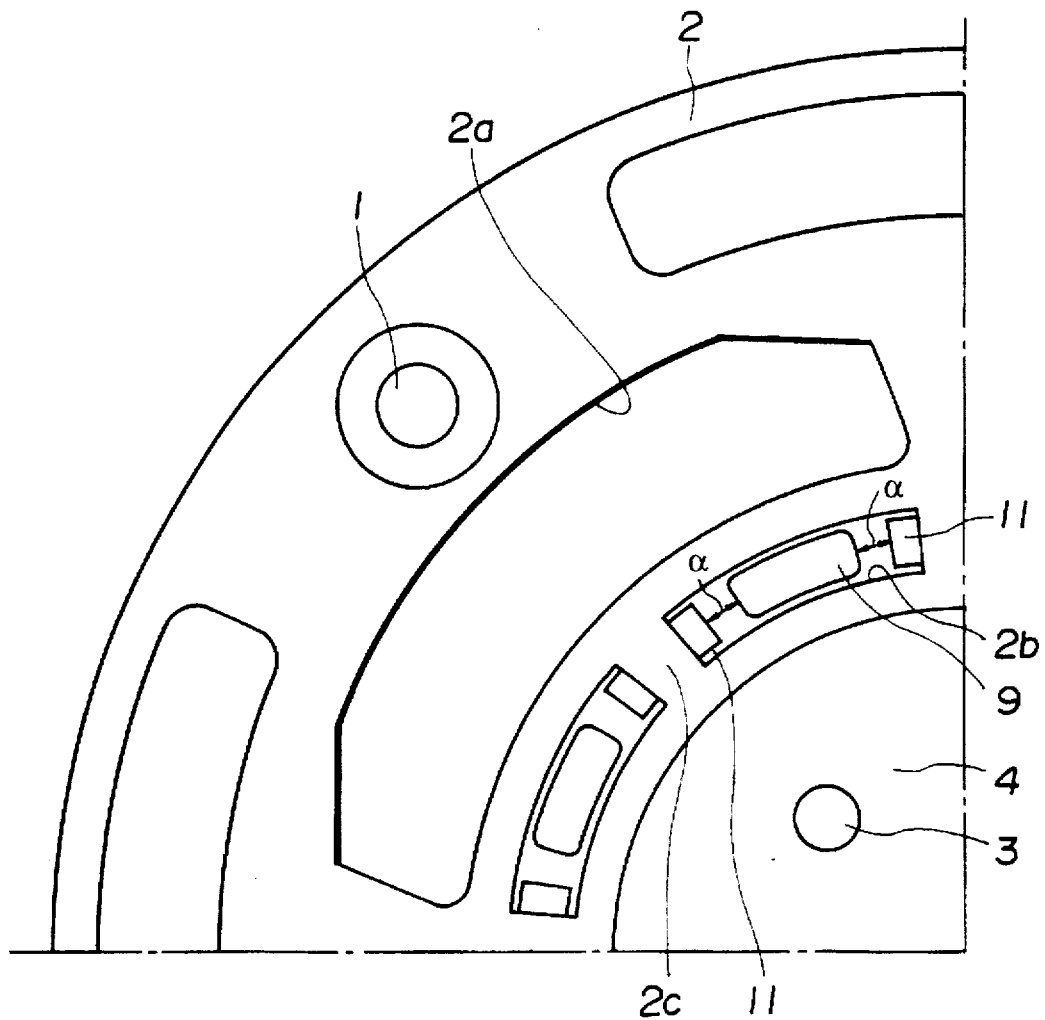
FIG. 4 is a view similar to FIG. 3A, showing a known vibration damping equipment for a torsional damper.
Figure 5:
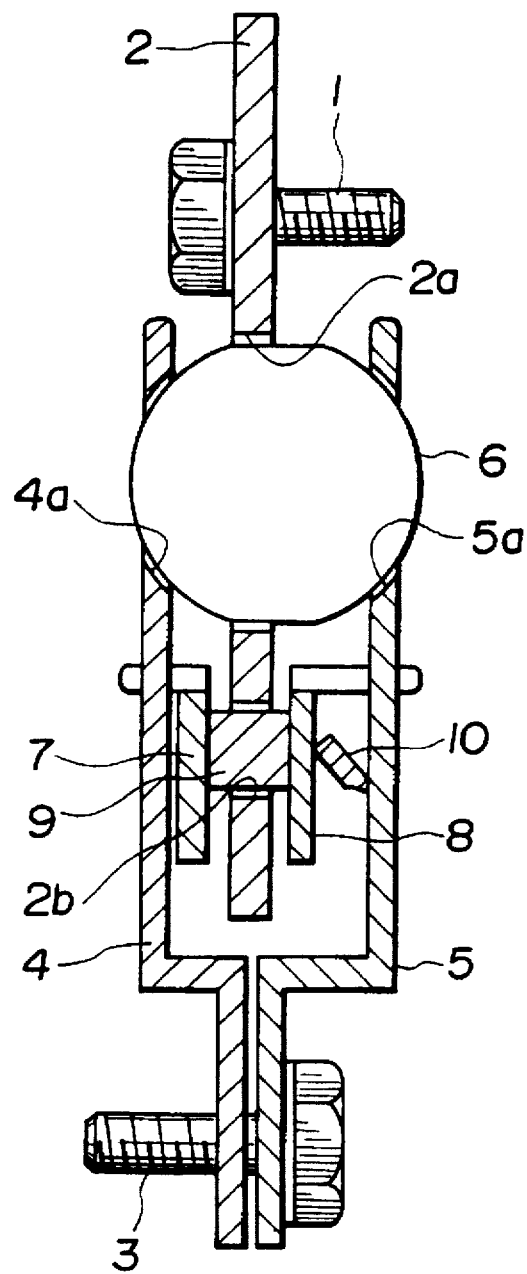
FIG. 5 is a cross section showing the known vibration damping equipment for a torsional damper.
Figure 6:
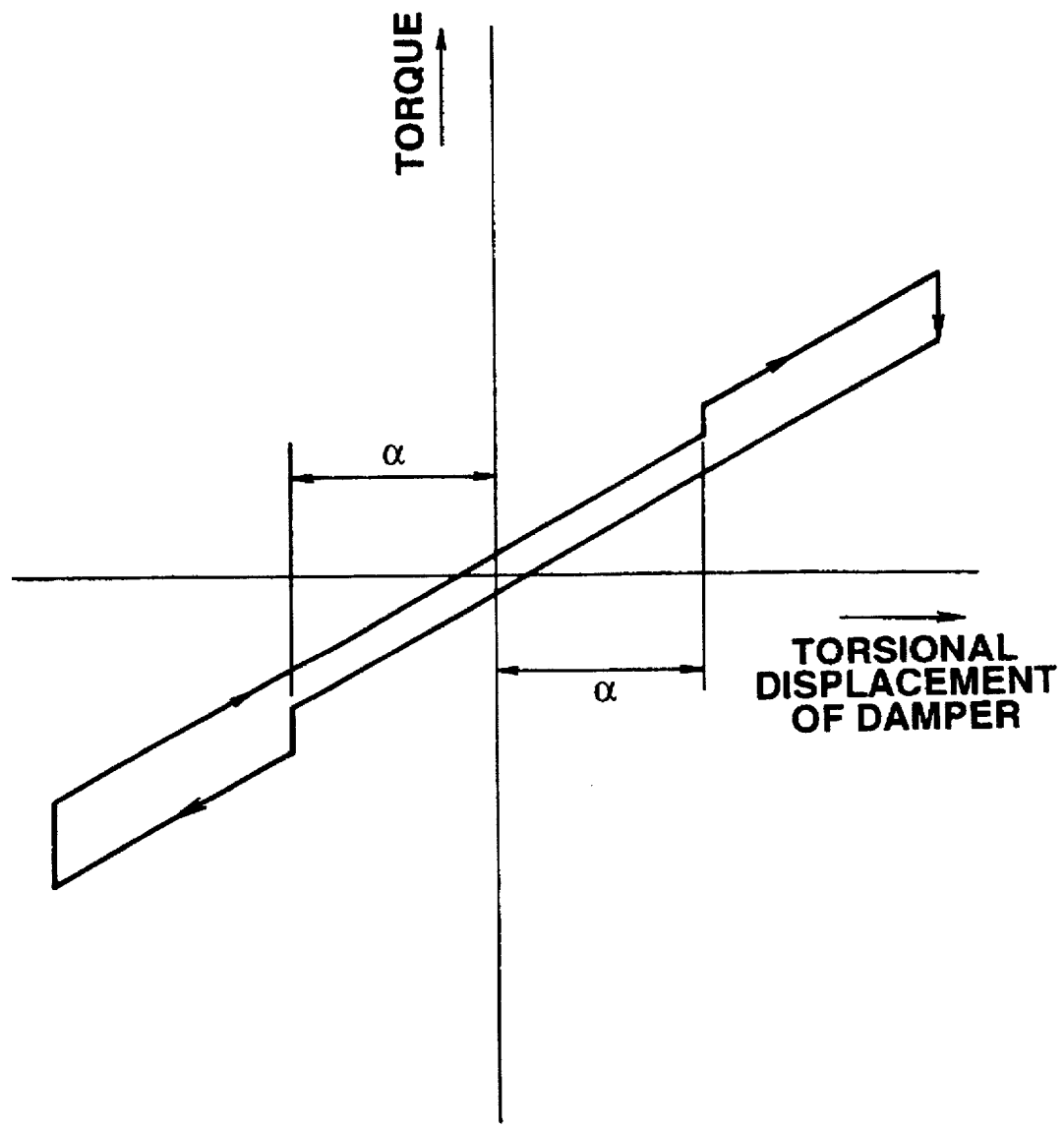
FIG. 6 is a graph illustrating a hysteresis characteristic of the known vibration damping equipment for a torsional damper.

FIG. 1A to 2 show a first embodiment of the present invention. The first embodiment is substantially the same as the known vibration damping equipment for a torsional damper disclosed in JP-A 7-98041 except the following changes:

The first embodiment is a proposed modification of the known vibration damping equipment for a torsional damper as shown in FIGS. 4 and 5. As for the prior art, referring to FIGS. 4 and 5, the low rigidity members 11 are arranged at both ends of the hub plate window or circumferential long hole 2b for the friction block 9, which is formed through the hub plate 2 connected to the torque converter (not shown) by the bolt 1, the torque converter and the engine output shaft (not shown) being drivingly coupled with each other through the torsional damper. In the first embodiment, the number of the low rigidity members is decreased by half as follows:

Referring to FIG. 1A, since a friction block 9 is disposed in a hub plate window 2b of the same shape and dimension as the prior art as shown in FIG. 4, and at the same angle as the prior art, an angle of play of the friction block 9 is also the same as the prior art, i.e. α. Therefore, the friction block 9 undergoes no change in a relative positional relationship with respect to retaining plates 7, 8, a hub plate 2, and side plates 4, 5, having the same layout as the prior art.

Referring to FIGS. 1A and 1B, in the first embodiment, members corresponding to the low rigidity members 11 arranged at both ends of the hub plate window 2b in the prior art are connected to each other for integration. Specifically, two low rigidity members 12a, 12b adjacent to each other through a partition 2c formed between two hub plate windows 2b as shown in FIG. 1A are connected on one axial side of the partition 2c as shown in FIG. 1B so as to obtain an integrated low rigidity member 12. In the first embodiment, the low rigidity members 12a, 12b are connected on the side of the retaining plate 7 as shown in FIG. 1B. Such connection prevents an influence on a hysteresis torque which the friction block 9 produces. It is noted that the integrated low rigidity member 12 may be connected on both axial sides of the partition 2c.

The reason why the low rigidity members 12a, 12b are connected on the side of the retaining plate 7 is as follows. If the low rigidity members 12a, 12b are connected on the opposite side, i.e. the side of the retaining plate 8, the retaining plate 8 is pressed and biased toward the friction block 9 by the disc spring 10 as shown in FIG. 5, having difficult heat transmission, resulting in difficult heat radiation from the side plate 5. Thus, the retaining plate 8 has a smaller heat capacity than the retaining plate 7 which can directly transmit heat to the side plate 4, so that even with the same quantity of heat produced on a slide surface of the retaining plate with slide motion of the friction block 9, the retaining plate 8 undergoes a greater temperature rise than the retaining plate 7, resulting in easy heat deterioration.

Moreover, referring to FIG. 1B, an axial length $D_1$ of the integrated low rigidity member 12 is smaller than an axial length $D_2$ of the friction block 9 to dispose the integrated low rigidity member 12 within the axial interval $D_2$ between the retaining plates 7, 8 arranged on both axial sides of the friction block 9 so as not to contact the retaining plates 7, 8. Such arrangement of the integrated low rigidity member 12 prevents an influence on the magnitude of a pressing force of the friction block 9 as indicated by small arrows in the friction block 9 in FIG. 2, and therefore, on the magnitude of a hysteresis torque.

It is noted that the axial length or thickness $D_1$ of the integrated low rigidity member 12 should be smaller than the axial length or thickness $D_2$ of the friction member 9. Because if the axial length or thickness $D_1$ of the integrated low rigidity member 12 is greater than the axial length or thickness $D_2$ of the friction member 9, an axial pressing force of the retaining plates 7, 8 operates on the integrated low rigidity member 12, producing no axial pressing force of the friction block 9 as indicated by small arrows in the friction block 9 in FIG. 2.

In the first embodiment, if rotational vibration of the torsional damper occurs due to resonance, it produces great relative rotation between the hub plate 2 and the side plates 4, 5, so that the friction block 9 is relatively circumferentially moved with respect to the hub plate 2 at first together with the side plates 4, 5 with which the friction block 9 is in frictional contact. After relative movement in the circumferential limiting range α in the hub plate window 2b, the friction block 9 comes into collision with the hub plate 2 for engagement. During this process, the retaining plates 7, 8 are pressed in the direction as indicated by large arrows in FIG. 2 by dish plates (not shown), respectively, which operates on the friction block 9. Therefore, after relative movement in the circumferential limiting range α, a frictional resistance or hysteresis torque is produced between the friction block 9 and the side plates 4, 5, enabling attenuation of the above rotational vibration.

In the first embodiment, the integrated low rigidity member 12 is arranged in a collided portion between the friction block 9 and the hub plate 2 with which the friction block 9 comes into collision for engagement after relative movement in the circumferential limiting range α, fulfilling an intervention of this engagement, resulting in a possible reduction in metallic noise due to engagement and vibration due to reaction.

The integrated low rigidity member 12 serves as a low rigidity member, which is constructed such that the two low rigidity members 12a, 12b adjacent to each other through the partition 2c formed between the hub plate windows 2b for accommodating the friction block 9 are connected to each other on the side of the retaining plate 7 in the axial direction of the partition 2c, achieving a half reduced number of the low rigidity members required in the whole equipment with respect to the prior art, resulting in a reduction in manufacturing cost.

Further, in the first embodiment, as being disposed as shown in FIGS. 1A and 1B, the integrated low rigidity member 12 can easily be engaged with the partition 2c of the hub plate windows 2b without any particular structure, adhesive, etc. for mounting, resulting in the excellent assembling efficiency.

Figure 3A:
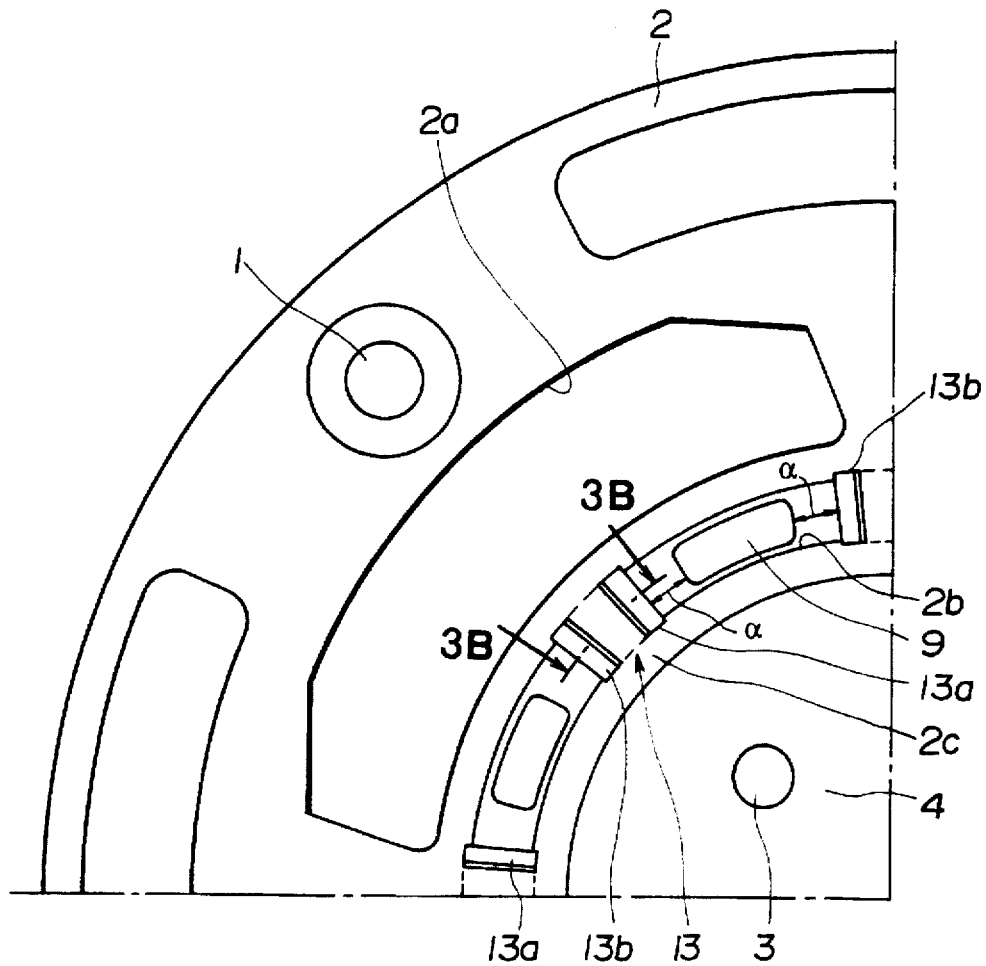
FIG. 3A is a view similar to FIG. 1A, showing a second preferred embodiment of the present invention.
Figure 3B:
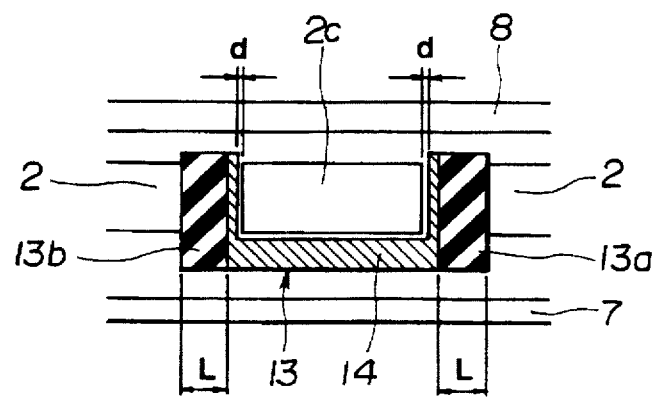
FIG. 3B is a view similar to FIG. 2, taken along the line 3B—3B of FIG. 3A.

FIGS. 3A and 3B show a second embodiment of the present invention. The second embodiment is variant of the connecting method of the two low rigidity members in the first embodiment.

Specifically, in the first embodiment, the two low rigidity members 12a, 12b adjacent to each other through the partition 2c formed between the two hub plate windows 2b are connected on one axial side of the partition 2c so as to obtain the integrated low rigidity member 12. On the other hand, in the second embodiment, referring to FIG. 3B, two low rigidity members 13a, 13b adjacent to each other through the partition 2c formed between the two hub plate windows 2b are connected by a high rigidity member or connector 14 which is different from the two low rigidity members 13a, 13b on one axial side of the partition 2c so as to obtain an integrated low rigidity member 13.

In the second embodiment, a compression spring constant of the integrated low rigidity member 13 is decreased in the way as described below.

The compression spring constant k is expressed by the following formula:

$$k = (S/L)E$$

wherein E is an elastic coefficient of a material of the low rigidity member; S is a load acting sectional area of the low rigidity member; L is a circumferential length or thickness of the low rigidity member.

The thickness L should be increased to decrease the compression spring constant k. When increasing the thickness L, layout of the friction block 9, etc. is difficult by ensuring the angle of play α greater than a predetermined value in the hub plate window 2b.

Thus, referring to FIG. 3B, layout having a clearance d is adopted so that the low rigidity members 13a, 13b disposed on both sides of the partition 2c of the hub plate windows 2b are both effective, obtaining the same compression spring constant k as the low rigidity member with the thickness of 2L.

Specifically, when the friction block 9 comes into collision with the low rigidity member 13a, its impact force is transmitted to the low rigidity member 13b through the high rigidity member 14. As being compressed by the high rigidity member 14 and the hub plate 2 in the clearance d as shown in FIG. 3B, the low rigidity member 13b bears part of a compressing force for absorption of the impact force. As a result, when the friction block 9 comes into collision with the hub plate window 2b, the low rigidity members 13a, 13b receive an impact load in series, having the compression spring constant equal to the low rigidity member with the thickness of 2L. Therefore, when having the same layout of the low rigidity member, etc. as the prior art, an approximately ½ reduction in the compression spring constant k is possible, obtaining the same compression spring constant k as the case that the low rigidity member with the thickness twice as large as the prior art is arranged in the same space as the prior art.

As for vibration damping operation in the second embodiment, when having, together with the side plate 4, relative displacement with respect to the hub plate 2 by the circumferential limiting range α, the friction block 9 comes into collision with the hub plate 2 through the integrated low rigidity member 13 arranged in the collided portion of the friction block 9, and not directly, preventing inconveniences such as occurrence of loud metallic noise due to collision and vibration due to reaction.

In the above embodiments, the low rigidity members (12, 12a, 12b; 13, 13a, 13b) are formed, preferably, by an impact absorbing material of a felt texture of para-aromatic polyamide fiber, for example. In that case, addition of the low rigidity members may not have harmful effects such as lowering of the thermal stability, strength, wear resistance of the vibration damping equipment, and therefore, the torsional damper.

Having described the present invention in connection with the preferred embodiments, it is noted that the present invention is not limited thereto, and various changes and modifications can be made without departing from the spirit of the present invention.

What is claimed is:

1. A torsional damper for ensuring cushioning of torque variation between two bodies of rotation to be drivingly coupled with each other, comprising:

a hub plate connected to one of the bodies of rotation, said hub plate having windows and a partition between said windows;

side plates arranged coaxial with and adjacent to said hub plate, said side plates being connected to the other of the two bodies of rotation;

a torsion spring arranged circumferentially with respect to said hub plate and said side plates, said torsion spring ensuring power transmission between said hub plate and said side plates;

a friction block arranged to be in frictional contact with said side plates, said friction block being engaged with said hub plate after movement relative to said hub plate in a corresponding one of said windows of said hub plate; and at least one low rigidity member interposed between said hub plate and the friction block, said at least one low rigidity member having end portions adjacent to each other and extended through adjacent windows of said hub plate with a central portion connecting said end portions, said central portion being disposed along said partition on one axial side of said partition with respect to the bodies of rotation, said one axial side of said partition having a greater heat capacity than another axial side of said partition.

2. A torsional damper as claimed in claim 1, wherein:
   said at least one low rigidity member has an axial length smaller than an axial length of said friction block.

3. A torsional damper as claimed in claim 2, wherein:
said at least one low rigidity member is disposed between retaining plates arranged on both axial sides of said friction block, said at least one low rigidity member being sized and disposed to avoid contact with said retaining plates.

* * * * *